United States Patent
Fortenberry et al.

(10) Patent No.: US 6,336,098 B1
(45) Date of Patent: Jan. 1, 2002

(54) METHOD FOR ELECTRONIC DISTRIBUTION AND REDEMPTION OF COUPONS ON THE WORLD WIDE WEB

(75) Inventors: Keith N. Fortenberry; James J. Toohey; Robert M. Szabo, all of Boca Raton; David J. Allard, Boynton Beach, all of FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/988,644

(22) Filed: Dec. 11, 1997

(51) Int. Cl.[7] .............................................. G06F 17/60

(52) U.S. Cl. ........................................... 705/14; 705/26

(58) Field of Search .............................. 705/14, 22, 28, 705/26, 10

(56) References Cited

U.S. PATENT DOCUMENTS

| | | | | |
|---|---|---|---|---|
| 4,554,446 A | * | 11/1985 | Murphy et al. | 235/487 |
| 4,882,675 A | * | 11/1989 | Nichtberger et al. | 705/14 |
| 4,949,256 A | * | 8/1990 | Humble | 705/14 |
| 5,008,519 A | * | 4/1991 | Cunningham et al. | 235/383 |
| 5,185,695 A | * | 2/1993 | Pruchnicki | 705/14 |
| 5,245,533 A | * | 9/1993 | Marshall | 705/10 |
| 5,249,044 A | * | 9/1993 | Von Kohorn | 705/14 |
| 5,256,863 A | * | 10/1993 | Ferguson et al. | 705/14 |
| 5,353,218 A | * | 10/1994 | De Lapa et al. | 705/14 |
| 5,420,606 A | * | 5/1995 | Begum et al. | 345/156 |
| 5,502,636 A | * | 3/1996 | Clarke | 705/10 |
| 5,710,886 A | * | 1/1998 | Christensen et al. | 705/14 |
| 5,761,648 A | * | 6/1998 | Golden et al. | 705/14 |
| 5,778,173 A | * | 7/1998 | Apte | 713/201 |
| 5,806,044 A | * | 9/1998 | Powell | 705/14 |
| 5,822,735 A | * | 10/1998 | De Lapa et al. | 705/14 |
| 5,845,259 A | * | 12/1998 | West et al. | 705/14 |
| 5,855,007 A | * | 12/1998 | Jovicic et al. | 705/14 |
| 5,870,718 A | * | 2/1999 | Spector | 705/26 |
| 5,903,874 A | * | 5/1999 | Leonard et al. | 705/14 |
| 5,907,830 A | * | 5/1999 | Engel et al. | 705/14 |
| 6,009,411 A | * | 12/1999 | Kepecs | 705/14 |
| 6,101,482 A | * | 8/2000 | DiAngelo et al. | 705/26 |
| 6,237,145 B1 | * | 5/2001 | Narasimhan et al. | 705/14 |

FOREIGN PATENT DOCUMENTS

| | | | | |
|---|---|---|---|---|
| EP | 0 809 202 | * | 11/1997 | G06F/17/60 |
| EP | 0 822 535 | | 2/1998 | G06F/17/60 |
| WO | WO 97/23838 | * | 7/1997 | G06F/17/60 |

OTHER PUBLICATIONS

Shermack, Kelly, "Electronic Coupon Program Offers Data–base Potential", Dialog File 15:ABI/INFORM, pp. 1–2, Sep. 1995.*

PR Newswire, "PC Quote Makes One of the Busiest Web Sites on the Internet Available to Advertisers", Dialog File 148:IAC Trade & Industry Database, pp. 1–2, Apr. 1996.*

(List continued on next page.)

*Primary Examiner*—Stephen R. Tkacs
*Assistant Examiner*—John W. Hayes
(74) *Attorney, Agent, or Firm*—Akerman & Senterfitt

(57) ABSTRACT

A method and system for electronic distribution and redemption of coupons on a computer network. The method includes the steps of: providing an electronic coupon in the form of a machine readable computer file; permitting a user of a client machine to receive the computer file via the computer network when the user accesses a selected coupon distribution web site; storing the computer file on the client machine; and authorizing a benefit when the computer file is received by a selected coupon redemption web site via the computer network. The method can further include the steps of transmitting the computer file from the coupon redemption web site to the centralized computer facility; and verifying the authenticity of the computer file prior to authorizing the benefit.

15 Claims, 4 Drawing Sheets

OTHER PUBLICATIONS

"The Internet Coupon Directory" web site page, Internet Odyssey Coupon (http://www.coupondirectory.com/), Jun. 1997.*

"Give Your Customers a Bonus" web site page, (http://www.express-news.net/internetodyssey/bzcoupon.html), Jun. 1997.*

"Parsons Technology $10 off Coupon" web site page, (http://www.parsonstech.com/coupon/coupon10p.html), Jun. 1997.*

"Here's Your Coupon" (Wizard Software Corp. Free Software) web site page, (http://www.coupondirectory.com/bin/DisCou . . . link-wizardsoftware.com/Demos_Free.html), Jun. 1997.*

PR Newswire, Emaginet's E-Centives Extends IBM's Net.Commerce Solution With Breakthrough Internet Marketing Technology, pp. 1–2, Dec. 1997.*

IBM Corporation, "Electronic Coupon Smart Cards for Internet PCs and Interactive TVs", Research Disclosure, vol. 41, No. 414, Oct. 1998.*

Bishop, Bill, "Crucial to Success of Digital Marketing", Communication World, vol. 13, No. 3, pp. 26–29, Mar. 1996* eShop Inc., "eShop Technology Adopted by International On-Line Leaders to Create Vibrant Internet Shopping Destinations", Dialog File 810: Business Wire, Jan. 1996.*

"Web Advertising not Haphazard; Qualified Traffic Led by Content", Interactive Marketing News, vol. 4, No. 11, Mar. 14, 1997.*

Hein, Kenneth, "First Fraud Proof Cybercoupons", Incentive, vol. 171, No. 10, Oct. 1997.*

SuperMarkets Online, Inc., "Secure Electronic Coupons", The Food Institute Report, Dec. 08, 1997.*

IBM Corporation, "Electronic Coupon Smart Cards for Internet Pcs and Interactive Tvs," *Research Disclosure*, vol. 41, No. 414, Oct. 1998.

* cited by examiner

METHOD FOR ELECTRONIC DISTRIBUTION AND REDEMPTION OF COUPONS ON THE WORLD WIDE WEB

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates generally to Internet electronic commerce and more particularly to a method of disseminating and redeeming coupons on-line for use with Internet shopping and computer shopping services.

2. Description of the Related Art

Coupons are commonly used to encourage potential customers to purchase products. Often, when a new product is introduced, paper coupons are created and distributed through direct mailings, newspapers and magazines in widespread campaigns attempting to reach those consumers potentially interested in purchasing that product. If a coupon is clipped and used by a consumer in a transaction, there is usually very little, if any data gathered to describe the buyer. This is a significant disadvantage since the process of gathering data reflecting the buying habits of consumers is useful to the marketing community to assist in better organizing product retailing efforts.

Paper coupon creation is usually initiated by a product manufacturer. An intermediate organization may be responsible for coupon printing and distribution to potential consumers of the targeted product. Typically, a consumer may clip a coupon from the newspaper and carry the coupon to a retail outlet. At the time of purchase, the coupon is presented to the cashier and the value of the coupon deducted from the product purchase price. After the purchase has been made, the retailer can submit the coupon to an intermediate organization that handles the redemption relationship on behalf of the manufacturer. The retailer is compensated for the coupon value and the manufacturer debited for the coupon amount. Thus, a one to one relationship exists between items purchased and physical inventory. This correspondence provides a method of verification or accountability indicating items were actually sold and coupons were not submitted by the retailer in a fraudulent manner.

With the growth of the World Wide Web, e-commerce and secure transactions, more consumers are purchasing items over the Internet. Currently, there exist certain web sites such as www.hotcoupons.com which deliver coupons selected from the user's browser screen contents and output to their local printer. The coupon is presented at the time of purchase to the service provider honoring the coupon. This is nearly identical to the process involved with a coupon clipped from a periodical, with one key difference being the distribution medium. Moreover, coupon usefulness may be severely limited if coupons may only be offered and used in connection with a single transaction associated with the web site offering the products which are to be discounted. A more advantageous system would permit maximum flexibility with regard to when and where a coupon is presented to a user. Further, it would be advantageous to provide maximum flexibility and convenience to individuals redeeming such coupons by avoiding limitations on when and where within the World Wide Web such coupons may be redeemed.

Thus, there remains a need to provide a method and system for distribution and redemption of coupons on the World Wide Web that overcomes these and other deficiencies of the prior art.

SUMMARY OF THE INVENTION

A method and apparatus for electronic distribution and redemption of coupons on a computer network. According to the method, the invention comprises the steps of providing an electronic coupon in the form of a machine readable computer file; permitting a user of a client machine to receive the computer file via the computer network when the user accesses a selected coupon distribution web site; storing the computer file on the client machine; and authorizing a benefit when the computer file is received by a selected coupon redemption web site via the computer network. The computer file can contain one or more of the following: a coupon serial number, an expiration date, a graphic image, a benefit definition or a product information data set.

According to one aspect of the invention, a determination of the benefit to be accorded to a user is based upon a benefit definition which is included as part of the computer file. The benefit can consist of, for example, a discount relative to a purchase price, a credit applicable to the purchase price of a product, or a special offer.

The coupon distribution web site and the coupon redemption web site are advantageously separate one from the other. In this regard, the method further involves the steps of creating the computer file at a centralized computer facility, and transmitting the computer file to the distribution web site via the computer network. A record of the transaction is advantageously transmitted from the coupon redemption web site to the centralized computer facility. Using this record, and others like it, a database is maintained at the centralized computer facility. The database can be used for fraud prevention as it concerns coupon redemption or for statistical marketing analysis reasons. For example, the fraud prevention step can consist of reconciling the record of the coupon redemption with an inventory reduction, linking each coupon redemption to a specific sale of the product to a customer.

According to another aspect, the method involves the further steps of requesting certain predefined information from the user as a condition for the user receiving the computer file; encoding the information as part of the computer file; and compiling the information as part of a computer record to be stored as part of the database when the coupon is redeemed.

In still a further aspect according to the method of the invention, the coupon redemption record comprises at least one or more of the following: an associated transaction number, a supplier/manufacturer name, a date on which the computer file was transferred to a user, a date the file was received at the coupon redemption web site, a merchant identification number, identification of the product purchased, the user name, and the user's e-mail address.

A system for implementing the foregoing method includes a programmable computer connectable to two or more web sites in a computer network in which users of client machines can access and receive computer data from the plurality of web sites. The system advantageously provides means for generating an electronic coupon responsive to a predetermined set of coupon criteria, the electronic coupon being comprised of a computer file. Further, means are provided for delivering the computer file to a predetermined coupon distribution web site on the computer network. The coupon distribution web site is configured to be responsive to at least one of the client machines to deliver the electronic coupon to the client machine for storage thereon. Finally, means are provided for receiving and storing a record from a coupon redemption web site to which the computer file has been transmitted by the client machine for receiving a benefit.

In a further aspect, the system may also include means for reconciling the record with a physical decrease in a seller's inventory. Such a reconciliation permits verification that a product sale has occurred for each instance in which one of the electronic coupons has been received at the coupon redemption web site.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
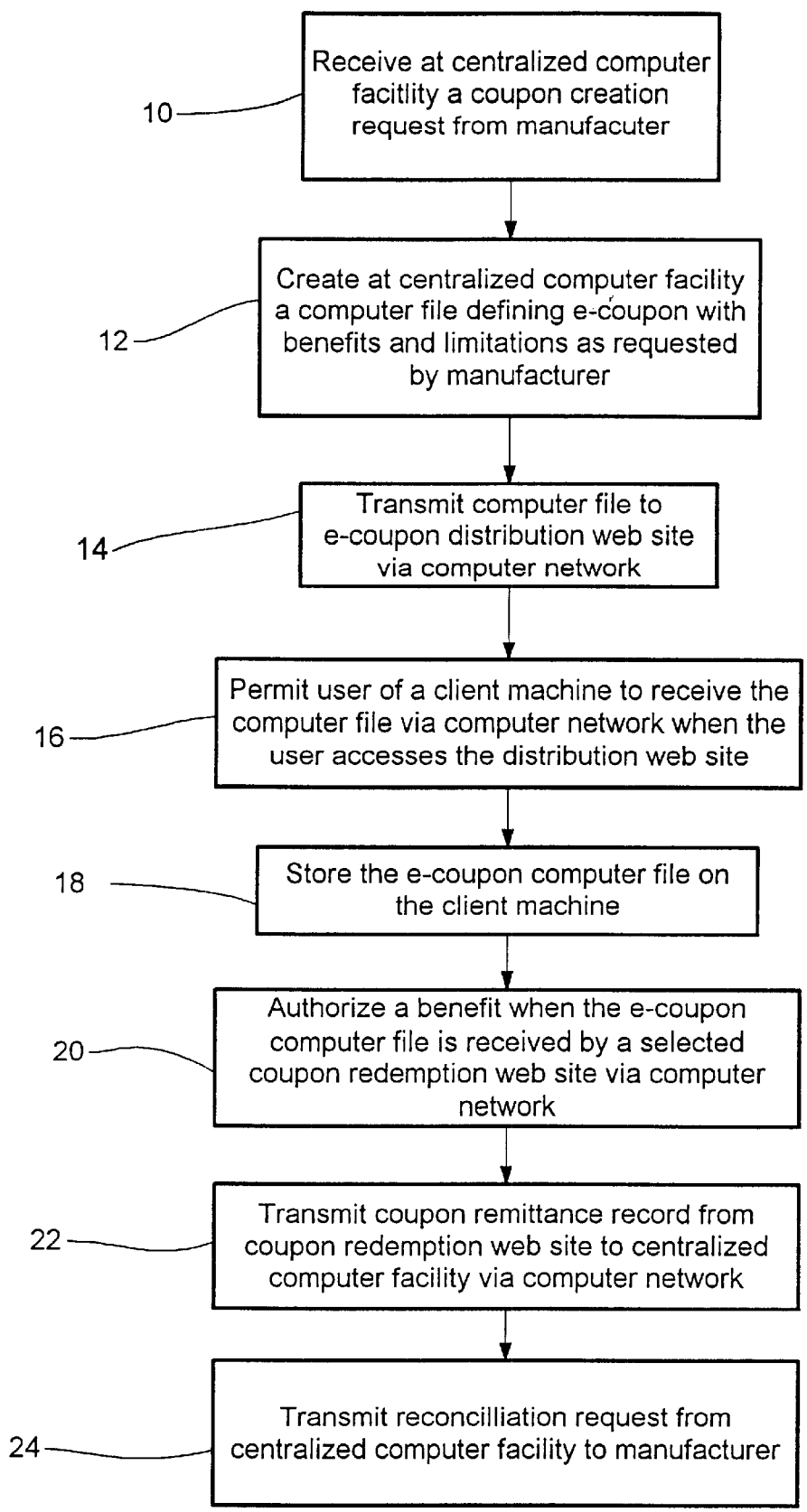
FIG. 1 is a flow chart illustrating a method for electronic distribution and redemption of e-coupons on the World Wide Web.
Figure 2:
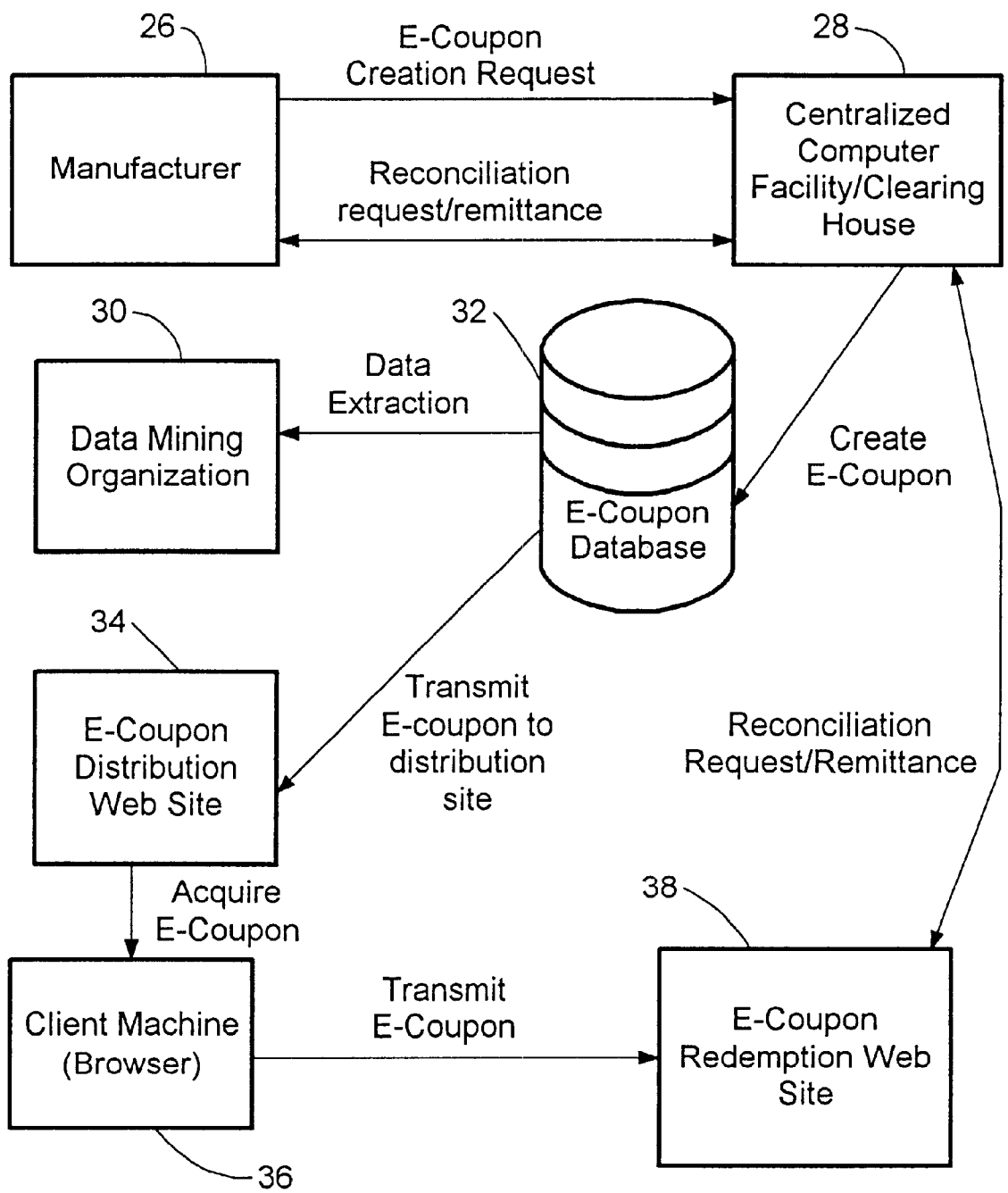
FIG. 2 is a block diagram illustrating a system for electronic distribution and redemption of e-coupons on the World Wide Web.

FIGS. 1 and 2 illustrate a method and apparatus for electronic distribution and redemption of e-coupons on a computer network. In step 10, a manufacturer 26 who wishes to offer coupons for certain products, contacts a centralized computer facility/clearing house 28. The manufacturer provides the electronic clearing house 28 with information regarding the nature of the coupon program, including for example, a benefit definition, the products with regard to which the benefit will be offered, any time limits associated with the coupon offer, the number of coupons to be offered, and perhaps any specific data which the user must provide before the coupon will be issued or redeemed. In addition, the manufacturer preferably also provides the address of the e-coupon distribution web site 34 on the World Wide Web which is to distribute the coupons, the address of the e-coupon redemption web site 38, and possibly the address of any data mining organization 30 to receive data extracted from the coupon redemption program. As used herein, the term data mining organization refers to any facility which analyzes data associated with coupon acceptance and/or redemption by consumers for improved product marketing.

Utilizing the foregoing information, the proprietor of the centralized computer facility 28 in step 12 causes an e-coupon to be created in the form of a standardized computer file format. This file format may include, for example, a coupon serial number, an expiration date, a graphic image, a benefit definition and a product information data set. The benefit definition identifies the specific benefit to be accorded to a user when the computer file is redeemed as will hereinafter be described. The benefit can consist of, for example, a discount relative to a purchase price, a credit applicable to the purchase price of a product, or a special offer. The special offer may be any type of special benefit to a customer such as a premium offer, a multiple unit discount offer, and so on. An example of the e-coupon format could be as follows:

Coupon Serial Number
Expiration date
Graphic Image
Product Information
Product Code
Product Description
Benefit Definition Once the e-coupon computer file has been created, the file is transmitted in step 14 to the e-coupon distribution web site 34, preferably via the Internet, an intranet, or other known network connection. It should be understood that the invention is not limited with regard to the precise manner by which the e-coupon computer file is transmitted to the distribution web site 34, and any other suitable means may also be used for this purpose. For example, the coupons may be stored on a physical storage medium such as a CD ROM, magnetic disk or other similar means, and physically delivered to the distribution web site 34. Further, it will be recognized by those skilled in the art that the e-coupon can be delivered in a form which includes the basic file, and a list of coupon serial numbers which are to be inserted as needed by the e-coupon distribution web site 34.

Web sites such as distribution web site 34 as referred to herein are preferably effected by means of a web server capable of being selectively accessed via a computer network by a client machine having a browser provided for such purpose. In the environment of the World Wide Web of the Internet, client machines effect transactions to web servers using the Hypertext Transfer Protocol (HTTP), which is a known application protocol providing users access to files including text, graphics, images, sound, video, and the like. HTML provides basic document formatting and allows the developer to specify links to other servers and files. According to the standard methods of accessing multiple web sites on the Internet, a network path or address is identified by a Uniform Resource Locator ("URL"). By using an HTML-compatible browser, a user of a client machine can specify a link to a particular desired web site identified with a URL. The client machine makes a request to the server identified by the URL and in return receives a specific document formatted according to HTML. In one example, a client machine can be connected to the web site by means of the Internet, an intranet, or other known network connection.

Web sites such as e-coupon web site 34 can be implemented by a variety of means including, for example, an IBM RISC System/6000 computer utilizing the AIX (Advanced Interactive Executive Version 4.1 and above) Operating System and a web server program, such as IBM Internet Connect Secure Server (Lotus Domino), that supports interface extensions. The system preferably includes a graphical user interface for management and administration of the server. While the foregoing system will provide suitable results, it will be recognized by those skilled in the field of Internet servers that there exist a variety of other hardware/operating systems/web server application program combinations which may also be used.

Client machines, as that term is used herein, can be any of a variety of personal computers which are available from a number of well-known computer manufacturers. Such machines preferably comprise a central processing unit (CPU), including one or more memory devices and associated circuitry. The memory devices typically comprise an electronic random access memory and a bulk data storage medium, such as a magnetic disk drive. The system includes a pointing device operatively connected to said computer system through suitable interface circuitry, and at least one user interface display unit such as a video data terminal (VDT) operatively connected thereto. The CPU can be comprised of any suitable microprocessor or other electronic processing unit, as is well known to those skilled in the art. An example of such a CPU would include the Pentium brand microprocessor available from Intel Corporation or any similar unit such as an 80486 or 80386 type microprocessor.

The various hardware requirements for the computer system as described herein can generally be satisfied by any one of many commercially available high speed personal computers offered by manufacturers such as Compaq, Hewlett Packard, or IBM Corp. In a preferred embodiment as discussed herein, the operating system for the computer is one of the Windows family of operating systems, such as Windows 3.1, Windows NT, or Windows 95. However, the system is not limited in this regard, and the invention may also be used with any other type of computer operating system incorporating a graphical user interface.

E-coupon distribution web site 34 is preferably configured so that when it is accessed by a client machine 36, the user is made aware of the e-coupon offer. If the user wishes to receive the e-coupon, the user can respond to the offer electronically using client machine 36 and the e-coupon will be transmitted to the client machine as illustrated in step 16. Depending upon the interest of the manufacturer 26 which initiated the coupon offer, the user may be permitted to obtain the coupon by simply electronically indicating a desire to receive same, or may be required to provide the e-coupon distribution web site with certain information as a condition precedent to receiving same. When such information is received, it is preferably encoded as part of the e-coupon computer file before the file is transmitted to the client machine 36.

When the coupon file is received, it is preferably stored by the user on the client machine as set forth in step 18.

Subsequently, in step 20 the e-coupon may be redeemed at an e-coupon redemption web site 38. In a preferred embodiment, the e-coupon distribution site 38 is distinct from the e-coupon distribution web site 34 for reasons which will be hereinafter explained. In any case, however, the e-coupon redemption web site is preferably also an e-commerce site, meaning that a user can purchase goods or services at such site via the computer network. The purchase of such goods and services can be accomplished in a variety of ways including, for example, transmitting a credit card number and order information from the client machine 36 to the e-coupon redemption site 38 to have the product shipped to an address, or by ordering product for a later pickup and payment.

In step 22, a record of the transaction is advantageously transmitted, via the computer network previously described, from the coupon redemption web site 38 to the centralized computer facility 28. Using this record, and others like it, a database 32 is maintained at the centralized computer facility. The database 32 can be used for fraud prevention as it concerns coupon redemption or for statistical marketing analysis reasons. For example, the fraud prevention step can consist of reconciling the record of the coupon redemption with an inventory reduction to link each coupon redemption to a specific sale of the product to a customer. The coupon redemption record comprises at least one or more of the following: an associated transaction number, a supplier/manufacturer name, a date on which the computer file was transferred to a client machine, a date the file was received at the coupon redemption web site 38, a merchant identification number, identification of the product purchased, the user name, and the user's e-mail address. For example, the following format may be used:

Associated Transaction Number

Supplier/Manufacturer

Name Date transferred to shopper

Merchant

Date redeemed

Merchant number

Item purchased

Consumer

Consumer Name

Consumer's domain

Other merchant defined demographic data for mining use

When the e-coupon is received by the centralized computer facility/clearing house 28, the coupon can be validated and a remittance or credit applied to the account for the operator of the e-coupon redemption web site 38. Subsequently, the redemption of the e-coupon can be reconciled with the manufacturer 26, to verify a physical inventory reduction. This is an important feature to minimize fraud. Further, the account of the centralized computer facility/clearing house can be credited for the value of the e-coupons.

The database records generated in step 22 for each transaction are advantageously accessed during reconciliation to demonstrate a one to one relationship between coupon usage and inventory reduction. Without such a mechanism, coupons submitted for reconciliation would not be linked to specific sales. Furthermore, the potential would exist for e-coupon fraud. For example, several coupons are accumulated and never used in legitimate transactions. Instead, the e-coupons are funneled back to an individual or organization affiliated with the e-coupon clearing house. The e-coupons are redeemed for cash value with no related goods being sold. In this case, the manufacturer initiating the e-coupon distribution has not received the desired benefits for the investment made in the e-coupon process.

The centralized computer facility 28 or clearing house as described herein, is positioned between manufacturers, related web sites and retailers. The facility 28 therefore facilitates the distribution and redemption of e-coupons. The centralized computer facility acts as a common service between manufacturers, content providers and retailers. Manufacturers initiate e-coupon creation. The centralized computer facility 28, acting on behalf of manufacturers, generates e-coupons, distributes to related web sites, receives cashed e-coupons from e-commerce retailers and accumulates consumer statistics.

In the system described with regard to FIGS. 1 and 2, a manufacturer wanting to introduce a new product or stimulate sales of an existing product being sold over the World Wide Web would define attributes such as the value of an e-coupon for a specific product and working with an e-coupon clearing house 28, makes the coupon available for distribution to selected web-based retailers. E-coupon distribution web sites 34 provide a point of access and a delivery mechanism for e-coupons to potential consumers. Content providers, involved with such sites, would engage the e-coupon clearing house to acquire e-coupons. These e-coupons would then be made available to visitors of the web site.

EXAMPLE 1

A user visits the Tennis Tournament web site. Marketing studies indicate a high correlation between visitors of sports related web sites and the purchase of athletic shoes. In this example, a manufacturer of athletic shoes creates a new tennis shoe and wants to stimulate sales. By sanctioning the Tennis Tournament web site for e-coupon distribution, the athletic shoe manufacturer targets a market of consumers more likely to buy athletic shoes. A user visiting the site sees the athletic shoe manufacturer's e-coupon offer for $5 off any athletic shoe purchased at the e-commerce web site of a particular athletic shoe retailer. The users decide to download the e-coupon for a future discount. The athletic shoe retailer, has a web site that is honoring the e-coupon worth $5 off the manufacturer's shoe. The user who previously visited the Tennis Tournament web site and downloaded the e-coupon, may submit or upload the coupon to the retailer's web site for a $5 discount in the e-commerce related transaction. Once the transaction is complete, the retailer can reconcile the transaction with the e-coupon clearing house. Subsequently, the e-coupon centralized computer facility performing the clearing house function will reconcile the transaction with the manufacturer.

One advantage of the present system is the ability to allow manufacturers to collect consumer information as described above. This consumer information may be stored in the central database 32. For example, a consumer initiates an e-commerce-based transaction with a retailer e-coupon web site 38. The consumer is identified, possibly by a name and credit card number. Additional information may be requested of the consumer desiring to use an e-coupon, such as sex, age, marital status, etc. The data is collected and stored in the database 32 for future analysis by relevant parties such as the manufacturer 26 who initiated the e-coupon process or a data mining organization 30. With this data, consumer behavior is better evaluated and predicted, thus providing better marketing input on the manufacturer side, yielding improved service to the consumer.

Figure 3:
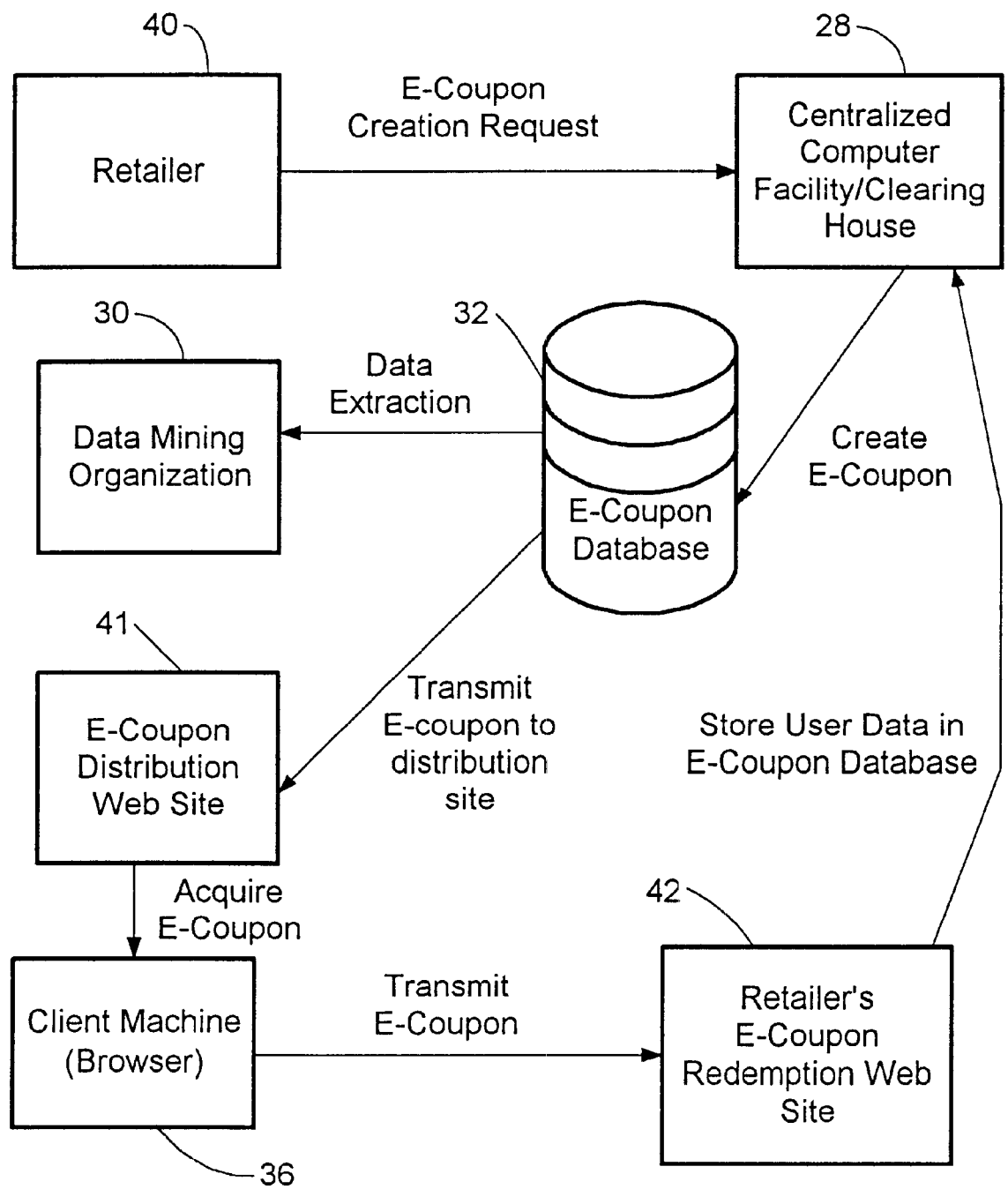
FIG. 3 is an alternative embodiment of the system shown in FIG. 2.
Figure 4:
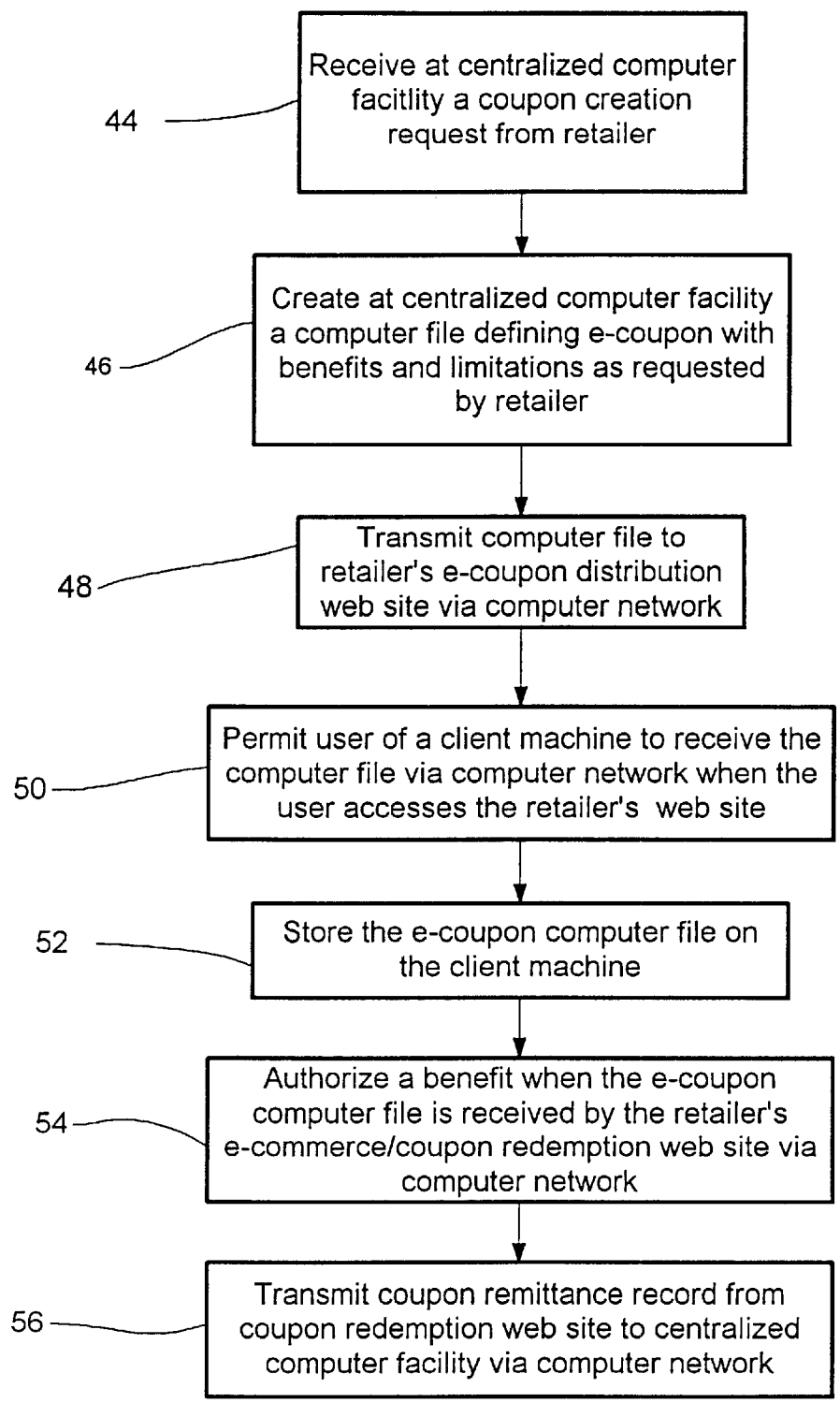
FIG. 4 is a flow chart illustrating an alternative embodiment of the method in FIG. 1.

FIGS. 3 and 4 illustrate an alternative embodiment of the invention in which the retailer 40, rather than the manufacturer, initiates the e-coupon process. In this case, the retailer 40 could work with the e-coupon centralized computer facility 28 for coupon creation. Distribution is still performed via the web in the same manner as previously described with respect to FIGS. 1 and 2. However, in this embodiment, e-coupon reconciliation is simplified as compared with the manufacturer initiated e-coupon process. Since the retailer 40 initiated the e-coupon, redemption is more an internal accounting function, rather than an external interaction with a centralized facility 28 and manufacturer 26. Data mining statistics are gathered as in the manufacturer model shown in FIGS. 1 and 2—at the time of the e-commerce transaction.

The invention as described herein facilitates the growth of electronic commerce (e-commerce) by moving coupons from the physical world to the Internet. With Electronic coupons (e-coupons), additional incentives are provided for the growing number of Internet users visiting electronic malls, catalogs or other retail outlets on the World Wide Web. Improved marketing of goods on the Internet will result from the analysis of accumulated statistics describing the behavior of Internet consumers utilizing e-coupons (data mining). An additional benefit to manufacturers is the reduction of mass marketing expense, since e-coupons, not paper coupons are used, no postage fees or paper coupon creation is required. This is beneficial to the environment, as well.

We claim:

1. A method for electronic distribution and redemption of coupons on a computer network, comprising the steps of:

providing an electronic coupon in the form of a machine readable computer file;

permitting a user of a client machine to receive said computer file via said computer network when said user accesses a selected coupon distribution web site, and to store said computer file in a memory of said client machine and receiving said computer file at a selected coupon redemption web site, separately situated and operated from said selected coupon distribution web site, via said computer network, from said client machine;

performing an e-commerce purchase transaction at said coupon redemption web site; separately situtated and operated from said selected coupon distribution web site;

authorizing a benefit to said user as part of said e-commerce purchase transaction when said computer file received by said coupon redemption web site pertains to a product purchased as part of said e-commerce transaction.

2. The method according to claim 1 further comprising the steps of:

creating said computer file at a centralized computer facility; and transmitting said computer file to said distribution web site via said computer network.

3. The method according to claim 1 further comprising the step of:

verifying the authenticity of said computer file prior to authorizing said benefit by using information encoded in said computer file.

4. The method according to claim 1 further comprising the steps of:

maintaining a database at a centralized computer facility;

requesting certain predefined user information from said user as a condition for said user receiving said computer file;

encoding said user information as part of said computer file;

transmitting a record at least partly comprised of said information, from said coupon redemption web site to said centralized computer facility via said computer network; and storing data comprising said record as part of said database.

5. The method according to claim 4 wherein said record is comprised of at least one of an associated transaction number, a supplier/manufacturer name, a date on which said computer file was transferred to a user, a date the file was received at said coupon redemption web site, a merchant identification number, identification of the product purchased, the user name, and the user's e-mail address.

6. The method according to claim 4 wherein said centralized computer service facility operates on behalf of product manufacturers and is distinct from the coupon distribution web site, said method further comprising the step of reconciling said record with an inventory reduction to link each record of a retail sale and coupon redemption to a specific reduction in inventory at said coupon redemption web site for said product, whereby said coupon distribution web site is prevented from fraudulently redeeming coupons for cash value.

7. The method according to claim 4 further comprising the step of providing said database to a data mining organization for analysis.

8. The method according to claim 1 further comprising the step of determining said benefit based upon a benefit definition which is included as part of said computer file.

9. The method according to claim 1 wherein said coupon distribution web site said coupon redemption web site are separate one from the other.

10. The method according to claim 1 wherein said benefit is selected from one of the group consisting of a discount relative to a purchase price, a credit applicable to the purchase price of a product, and a special offer.

11. The method according to claim 1 wherein said computer file contains at least one of a coupon serial number, an expiration date, a graphic image, a benefit definition and a product information data set.

12. A programmable computer connectable to a plurality of web sites in a computer network in which users of client machines can access and receive computer data from said plurality of web sites, comprising:

a centralized computer facility having means for generating an electronic coupon responsive to a predetermined set of coupon criteria, said electronic coupon comprised of a computer file;

means for delivering said computer file to a predetermined coupon distribution web site on said computer network, said coupon distribution web site responsive to at least one of said client machines to deliver said electronic coupon to said client machine for storage thereon;

means for receiving said computer file from said client machine at a coupon redemption web site separately situated and operated from said coupon distribution web site via said computer network and completing an e-commerce purchase transaction at said separately situated and operated web site; and means for authorizing a benefit to said user of said client machine as part of said e-commerce transaction when said computer file received by said coupon redemption web site pertains to a product purchased as part of said e-commerce transaction.

13. The programmable computer according to claim 12 further comprising:

means provided at said centralized computer facility for reconciling said record to verify that a product sale has occurred at said coupon distribution web site for each instance in which one of said electronic coupons has been received at said centralized computer facility from said coupon redemption web site;

and wherein said centralized computer service facility operates on behalf of product manufacturers and is distinct from the coupon distribution web site in order to prevent said coupon distribution web site from fraudulently redeeming coupons for cash.

14. The programmable computer according to claim 12 wherein said computer file contains at least one of a coupon serial number, an expiration date, a graphic image, a benefit definition and a product information data set.

15. The programmable computer according to claim 12 wherein said record is comprised of at least one of an associated transaction number, a supplier/manufacturer name, a date on which said computer file was transferred to a user, a date the file was received at said coupon redemption web site, a merchant identification number, identification of the product purchased, the user name, and the user's e-mail address.

* * * * *